Dec. 30, 1930.    R. V. ARNOLD ET AL    1,786,556
FEEDER AND DISINTEGRATOR OR MIXER
Filed July 3, 1929
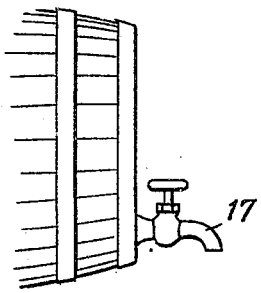
Fig. 1.
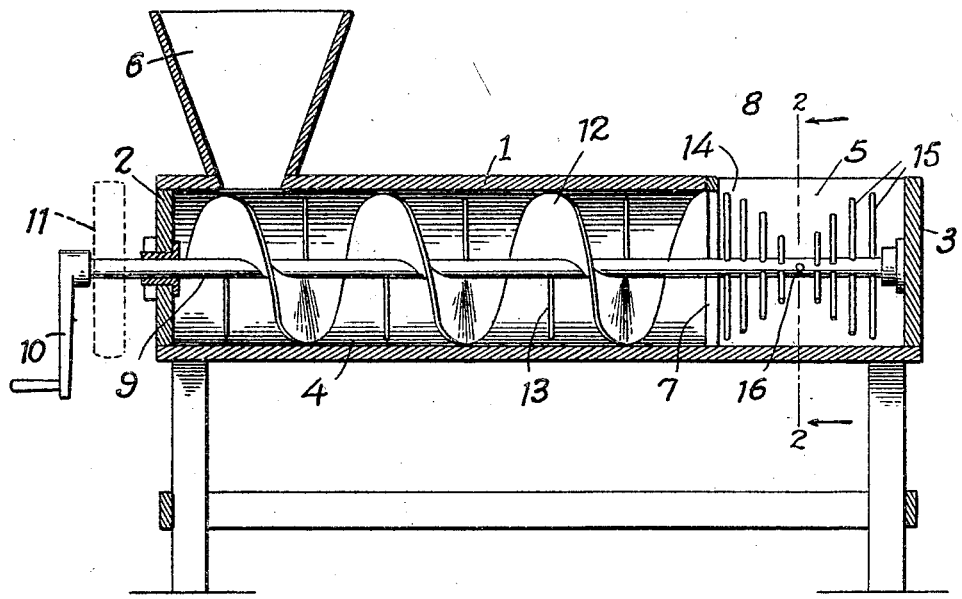
Fig. 2.
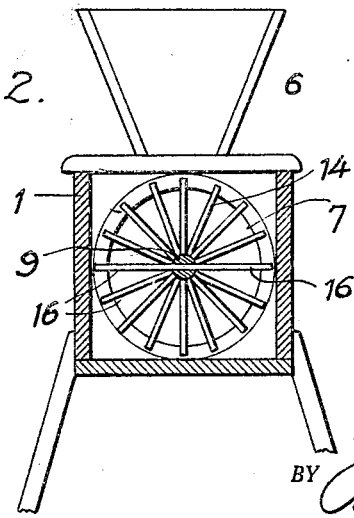
Inventors,
Robert V. Arnold,
Emory E. Flickinger,
Solomon E. Wantz,
BY
ATTORNEY.

Patented Dec. 30, 1930

1,786,556

UNITED STATES PATENT OFFICE

ROBERT V. ARNOLD, EMORY E. FLICKINGER, AND SOLOMON E. WANTZ, OF TANEY-TOWN, MARYLAND

FEEDER AND DISINTEGRATOR OR MIXER

Application filed July 3, 1929. Serial No. 375,714.

This invention relates to feeders or mixers of that type comprising a feed conveyor having means coacting therewith for agitating and disintegrating or mixing fodder or other materials, and the object of the invention is to provide a device of this character whereby a more thorough and efficient agitating and disintegrating and mixing action may be obtained while a continuous or uninterrupted feed of the material or materials is progressing.

The invention consists of the features of construction, combination and arrangement of parts, hereinafter fully described and claimed, reference being had to the accompanying drawing, in which:—

Fig. 1 is a vertical longitudinal section through a feeder and disintegrator or mixer embodying our invention.

Fig. 2 is a transverse section on line 2—2 of Fig. 1.

In the practical embodiment of our invention we provide a feeder and disintegrator or mixer comprising a horizontal casing 1 having closed end walls 2 and 3 and internally arranged to form a feeding and disintegrating or mixing chamber 4 and an outlet chamber 5. The chamber 4 is in communication at its outlet end with the inlet end of the chamber 5, and said chamber 4 is in communication at its inlet end with a hopper or feed inlet device 6 through which the material to be acted upon is introduced thereinto. The chamber 5 is closed by the wall 3 at its end opposite its inlet 7 forming the outlet of the chamber 4, but is open at its top to provide an outlet 8, whereby the material acted upon is forced to move upwardly before discharge.

Journaled in bearings in the walls 2 and 3 is a longitudinally extending shaft 9, which projects at one end beyond the wall 2 and is provided with a crank 10 for operating it by hand, when desired, and it may be provided with a pulley or gear 11, indicated in dotted lines, for driving it from a motor of suitable type. The shaft 9 extends through both chambers 4 and 5, and on that portion of the shaft extending through the chamber 4 is a spiral feed blade or worm 12, the convolutions of which are arranged in alternation with radially extending agitator or stirrer arms 13, whereby the material feeding from the inlet end of the chamber 4 toward the outlet end 8 thereof is disintegrated or mixed by the agitating action of the feeder blade and arms, as will be readily understood.

The material fed by the feed screw 12 through the outlet 8 into the chamber 5 is retarded in its discharge from said chamber 5 due to the fact that it must rise therein to the level of the outlet 8 before it can begin its discharge. By this means a compact column of the material may be kept feeding through the device in such a manner as to ensure absolutely thorough disintegration or mixing of the components thereof. In order to ensure thorough disintegration or mixture of the material before its final discharge, the portion of the shaft 9 within the chamber 5 is provided with two sets of agitator or stirrer arms 14 and 15, arranged in the form of reverse spirals, and an intermediate agitator or mixer 16 comprising diametrically extending arms, for the purpose of moving the material backward and turning it over during this process in order to break up the same into fine particles or to ensure thorough admixture of the particles. To this end the arms 14 act to push the material toward the arms 15 while agitating the same, and the arms 15 act to move the material backward toward the arms 14 while agitating the same, and the arms 16 break up the material between the sets of arms 14 and 15, so that besides the building up movement of the material in the chamber 5 due to the feed action of the screw 12, a back and forth and transverse motion of the material is established so that a maximum degree of disintegrating or mixing agitation is obtained.

Our invention may be employed for feeding and disintegrating or mixing all kinds of materials, whether soft, hard or of a medium degree of hardness, and whether solid, liquid, or a combination of solid and liquid materials. Usually in such devices the material discharges with such ease through an outlet that very often refractory materials are inefficiently disintegrated or mixed. Our invention, however, ensures the thorough disintegration or mixing of the material or materials, due to the upflow of the material at the discharge end before discharge and the action of the elements 14, 15 and 16 thereon while the material is flowing upwardly and tends to drop by gravity. The invention provides, in addition, a very simple type of device for the purpose. If desired, a faucet or other similar device 17 may be arranged to supply a liquid to the hopper 6 for admixture with any other material being supplied to the feeder.

Having thus fully described our invention, we claim:—

1. A device of the character described comprising a horizontal casing provided with a feed chamber having an inlet in its top at one end of said casing and a discharge chamber communicating with said feed chamber and having an outlet in its top at the opposite end of said casing, a feeder in the feed chamber for continuously forcing the material in a forward direction only therein from the inlet toward the discharge chamber, and means in the discharge chamber and arranged solely below the outlet in the chamber for moving the material back and forth in said chamber to give it a combined mixing and retarding action and to force its upward discharge through the outlet.

2. A device of the character described comprising a horizontal casing having a feed chamber and a discharge chamber, the feed chamber having an inlet at its top, arranged at one of the casing, and the discharge chamber having an outlet at its top and being arranged at the opposite end of the casing, a shaft extending along said chamber, a feed screw on the portion of the shaft within the feed chamber, a set of spirally disposed mixer arms on the portion of the shaft within the discharge chamber for moving the material continuously in a forward direction only, and a second set of spirally disposed mixer arms on the shaft below the outlet for moving the material back and forth therein while simultaneously agitating said material and exerting a retarding action on the material to cause it to pass upward under the feed pressure of the feed screw through the outlet.

In testimony whereof we affix our signatures.

ROBERT V. ARNOLD.
EMORY E. FLICKINGER.
SOLOMON E. WANTZ.